Nov. 6, 1928.

J. S. DONNELLAN

SANITARY BUTTER SLICING MACHINE

Filed Nov. 22, 1926     4 Sheets-Sheet 1

1,690,480

Inventor:
J. S. Donnellan
by Hazard and Miller
Attorneys

Nov. 6, 1928.
J. S. DONNELLAN
1,690,480
SANITARY BUTTER SLICING MACHINE
Filed Nov. 22, 1926      4 Sheets-Sheet 2
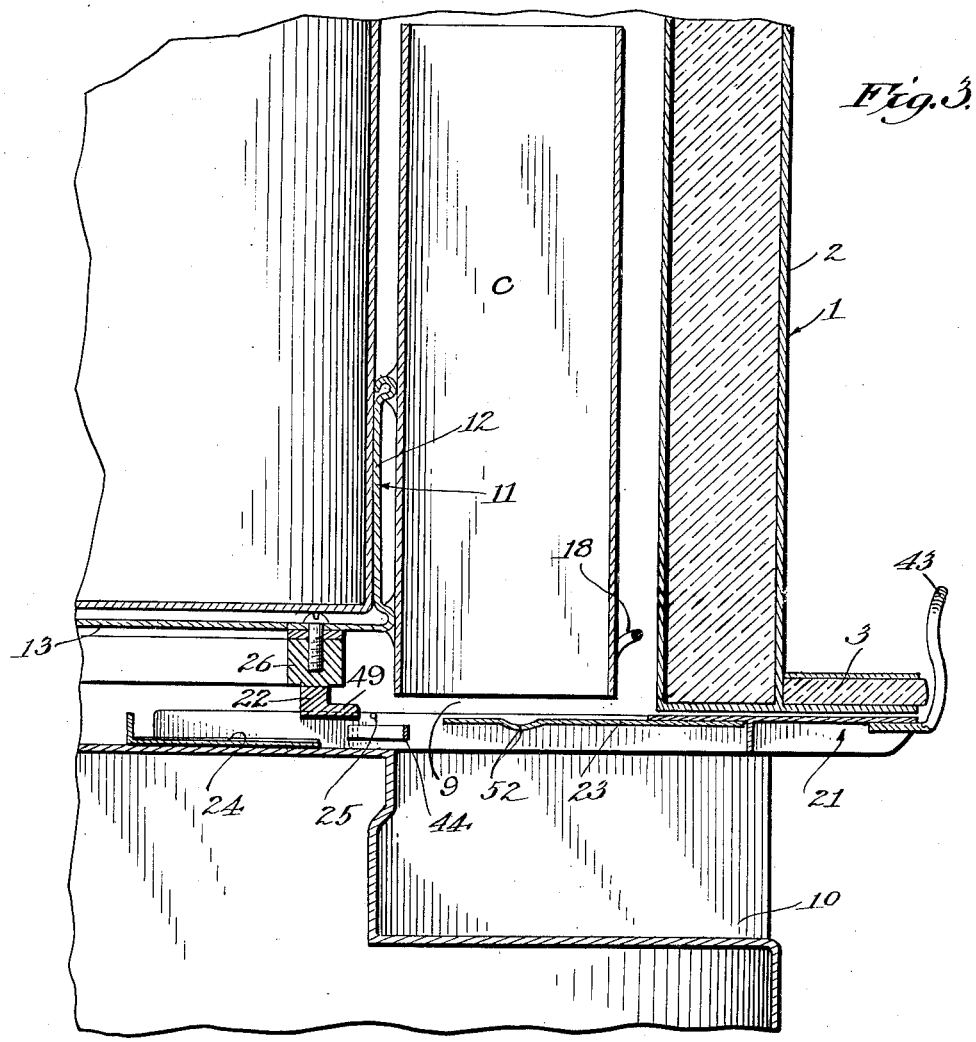
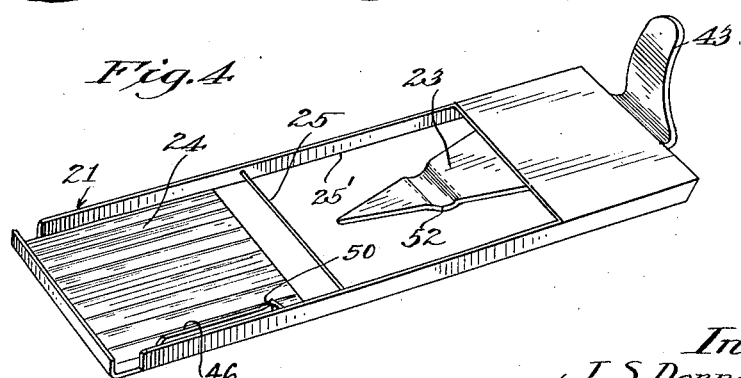
Inventor:
J. S. Donnellan,
by Hazard and Miller
Attorneys Nov. 6, 1928.

J. S. DONNELLAN 1,690,480

SANITARY BUTTER SLICING MACHINE

Filed Nov. 22, 1926 4 Sheets-Sheet 3

Inventor:
J. S. Donnellan,
by Hazard and Miller
Attorneys

Nov. 6, 1928.
J. S. DONNELLAN
1,690,480
SANITARY BUTTER SLICING MACHINE
Filed Nov. 22, 1926     4 Sheets-Sheet 4
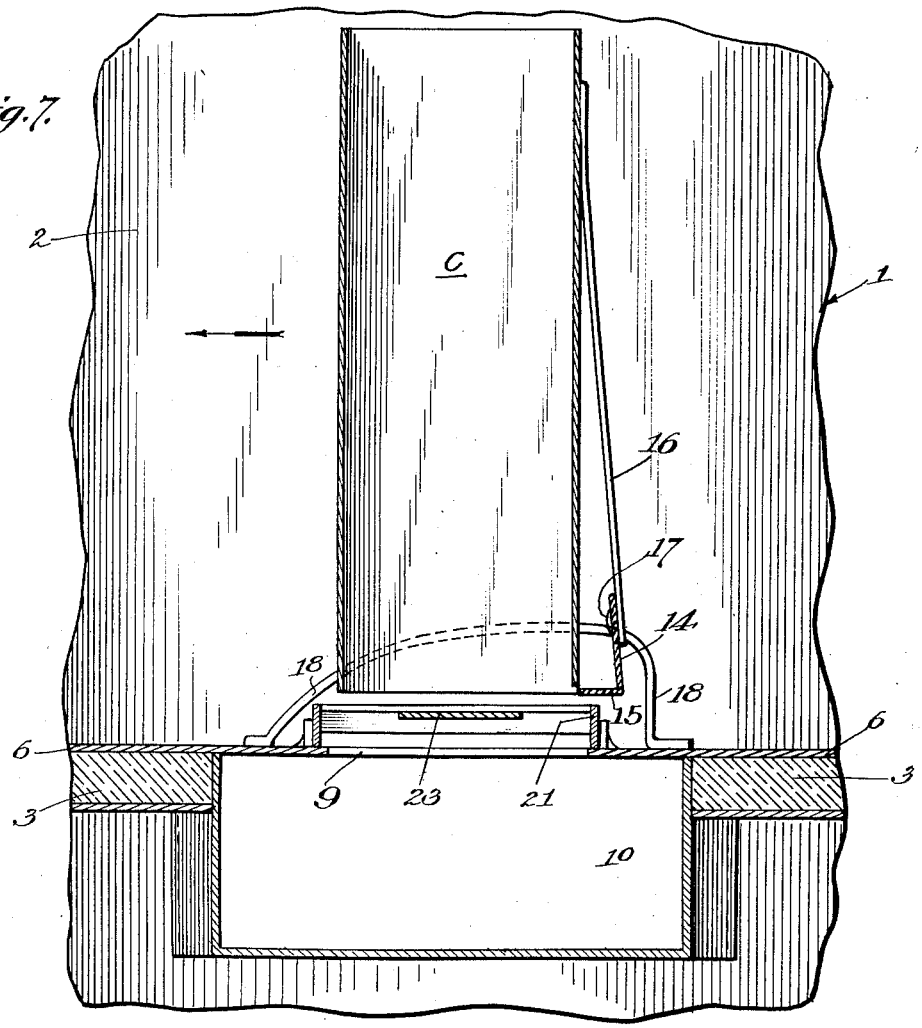
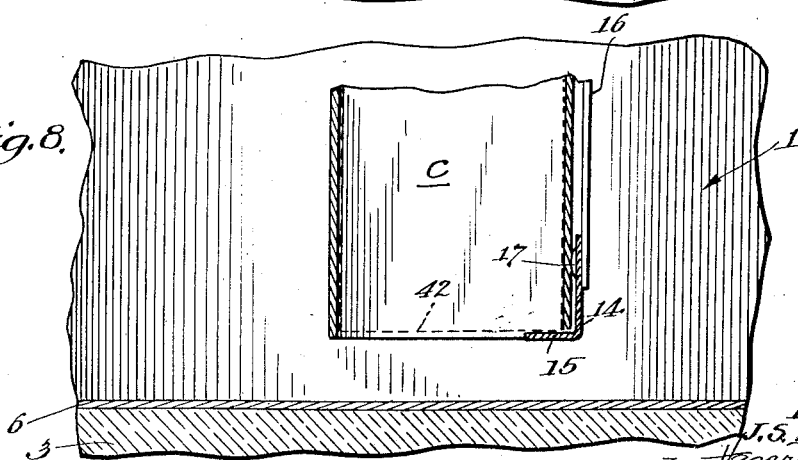

Patented Nov. 6, 1928.

1,690,480

UNITED STATES PATENT OFFICE.

JAMES S. DONNELLAN, OF LOS ANGELES, CALIFORNIA.

SANITARY BUTTER-SLICING MACHINE.

Application filed November 22, 1926. Serial No. 149,932.

This invention relates to sanitary butter slicing machines, and especially to a type of machine which is adapted for general and public use in restaurants, cafés, cafeterias and the like.

An object of my invention is to provide a device which is adapted to efficiently store butter and keep the same in a fresh condition and at the same time to provide means whereby without opening the storage space slices of butter may be cut for use as desired.

Another object of my invention is to provide a storage machine which is adapted to individually retain bars of butter such as are marketed by all manufacturers and which are usually wrapped in small half pound bars.

A further object of my invention is to provide a machine in which these bars are individually stored and which is adapted to slice and dispense these bars one slice at a time.

With the foregoing and other objects in view which will be made manifest in the following detailed description and specifically pointed out in the appended claims, reference is had to the accompanying drawings for an illustrative embodiment of the invention, wherein:

Fig. 3 is a sectional side view of the butter slicing device showing one of the individual butter bar containers in position over my slicing device.

Figure 5:
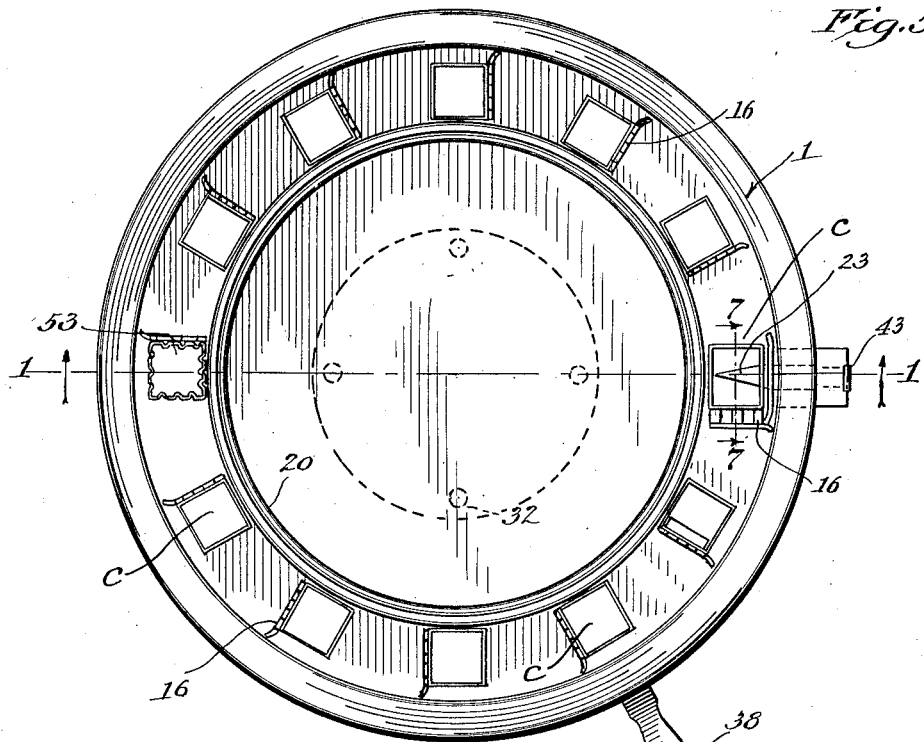
Figure 6:
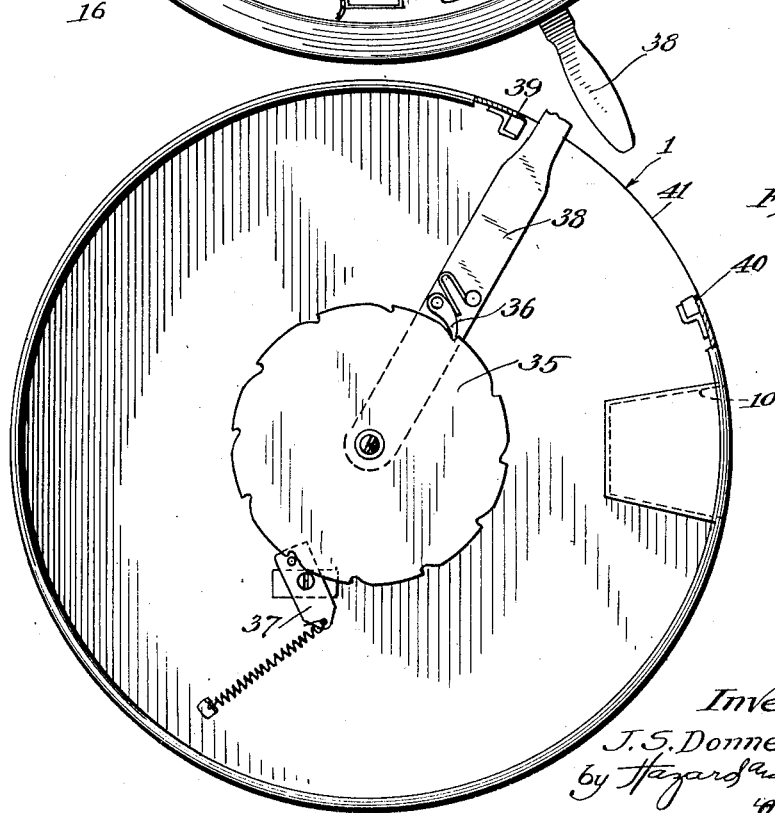

Fig. 4 is a perspective view of the butter slicing device removed from the container, Fig. 5 is a plan view of my container showing the individual butter bar compartments, Fig. 6 is a plan view of the ratchet and pawl mechanism employed in connection with my device which mechanism serves to rotate the individual butter bar compartments and position them over the butter slicing device, Figure 7 is a sectional view showing the details of one of the butter compartments occupying a position over my butter slicing device, and also showing the butter dispensing box. This view is a view taken substantially along the lines 7—7 of Figure 5, and Fig. 8 is a side section of a portion of one of the individual butter compartments when the same is not in position over my butter slicing device.

Referring to the accompanying drawings wherein similar reference characters designate similar parts throughout, 1 designates the butter container as a whole. This container comprises an annular wall shown at 2, and a bottom 6 and a cover 4. This annular wall with the bottom 6 and the cover 4 is preferably heat resisting and toward that end embodies heat resisting material 3. The cover 4 is provided with a suitable handle shown at 5. This container is provided with a depending apron 7 which has knurled or rolled edges 8 upon which the container is supported. Indicated at 9 is an opening through which butter when sliced is adapted to be dispensed into a dispensing box 10. The annular wall 1, the cover 4, the apron 7 and the bottom 6 cooperate to form the butter container proper.

Figure 1:
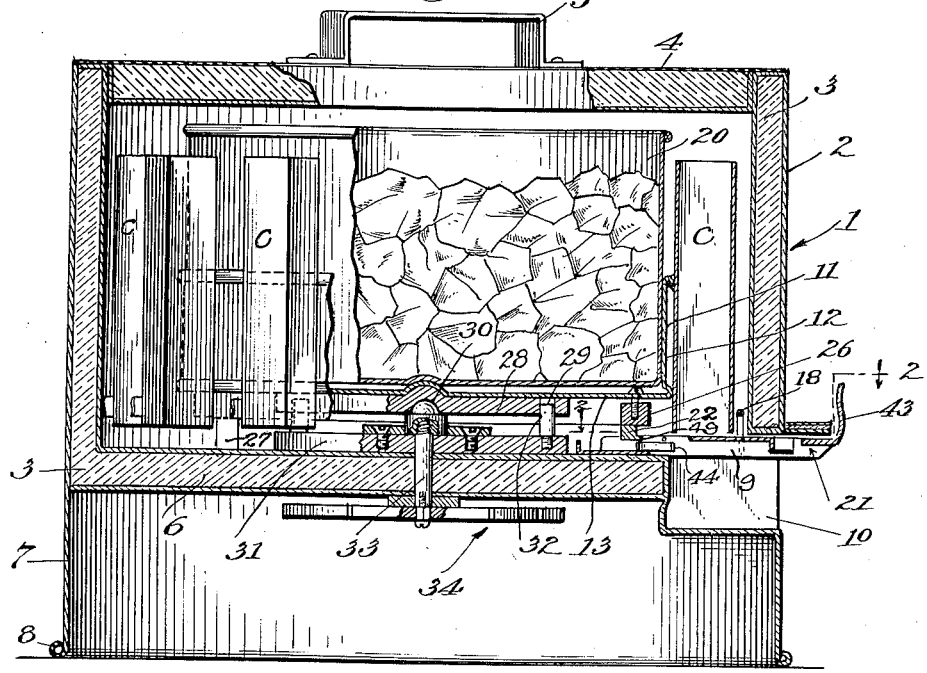
Figure 1 is a sectional view showing the details of my refrigeration machine including the container, the cover, the individual housings for bars of butter and the ice compartment. This is a view taken substantially along the lines 1—1 of Figure 5.

Rotatably and removably mounted in this butter container, as clearly shown in Fig. 1, is a tray 11. The specific manner in which this tray is mounted will be described hereinafter. This tray comprises an annular side wall 12 and a bottom 13 and is adapted to have an ice pan 20 removably mounted therein. Securely fastened by means of soldering, brazing, welding or in any suitable manner to the side wall 12 of the tray 11 are a series of open ended tubular storage compartments C, each of which is adapted to house an individual bar of butter, such as are on the market in all cities in half pound bars. These compartments are in spaced circumferential relation and the axes of their lengths are in parallel vertical relation. A butter supporting member 14 is resiliently mounted on each of said compartments and has an inwardly extending ledge 15 which extends partially across an open end of said compartments C. This supporting member 14 is mounted resiliently on the compartment by means of a spring arm 16. The supporting member 14 is further provided with a lug 17 which is adapted to engage a cam surface 18 to thus withdraw the ledge 15 from its position beneath the tubular compartment C, as clearly shown in Fig. 7.

Figure 2:
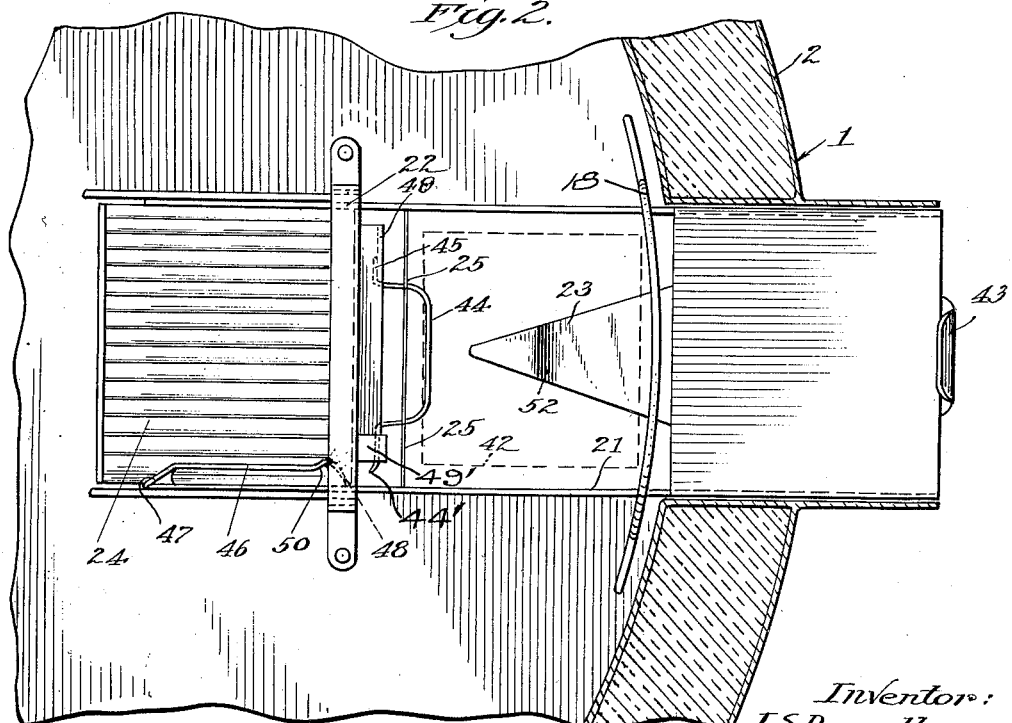
Fig. 2 is a sectional view, greatly enlarged, of the specific butter slicing device employed in connection with my invention, taken substantially along the lines 2—2 of Figure 1.

Referring more particularly to Figs. 3 and 7, a butter dispensing opening 9 is provided in the bottom wall of the butter container proper. Slidably mounted over this opening is a butter cutting tray 21. This butter cutting tray shown in detail in Figs. 2 and 4 is slidably held in position by means of a strap 22 shown in Fig. 2. The butter cutting tray 21 is provided with a wedge-shaped ledge 23 and a rectangular ledge 24, the wedge-shaped ledge 23 having an elevation which is slightly greater than the rectangular ledge 24. A thin wire cutter 25 extends across the opening 25' in the cutting tray.

The specific manner of mounting the tray 11 and butter compartments C attached thereto will now be described in detail. On the under side of the tray is an annular rack 26, while mounted on the bottom wall of the butter container are a plurality of projections 27 upon which the annular rack is adapted to rest and slide. Also mounted on the bottom of the tray is a plate 28. This plate is provided with four marginal apertures 29 and a central aperture 30. Mounted centrally on the interior of the bottom wall of the container proper is a similar plate 31 having pins 32 corresponding to the apertures in the first mentioned plate 28. This plate 31 is rotatably mounted on the bottom wall of the container and the pins 32 thereon are adapted to fit the apertures in the plate 28 whereby the tray and individual butter compartments are rotatably mounted within the container. As shown in Fig. 1 the plate 31 is connected by means of a bolt 33 with a ratchet and pawl mechanism designated as an entirety at 34 and which is shown in detail in Fig. 6. There is no claim made as to novelty of my ratchet and pawl mechanism and I have selected the same from the prior art and it comprises in general a ratchet wheel 35, a pawl 36, a retainer 37 and a lever 38. Resilient strips 39 and 40 are formed on the apron 7 and the lever 38 extends through a slot 41 in the apron. These strips serving as stops are so arranged that one complete movement back and forth of the lever handle from stop to stop will serve to center one of the butter compartments C over the opening 9 in the bottom wall of the butter container.

The exact cycle of events which take place during one back and forth movement of the lever and consequently from the time one butter compartment C is centered over the opening until the adjacent butter compartment C is centered over the opening 9 will now be described in full. The description of these events will constitute a complete description of the mode of operation of my device. When one of the butter compartments C is remote from the opening in the bottom wall of the container, the arrangement of parts will assume a position as shown in Fig. 8 of the drawing with the ledge 15 extending partially beneath the open end of the compartment C. A bar of butter shown in dotted lines at 42 and which preferably is a half pound of butter rests upon this ledge in the compartment where the same is stored. As the compartment is brought into alignment with the opening 9 by means of a movement of the lever handle 38, the lug 17 engages the cam surface 18 as shown in Fig. 7 and the ledge 15 is withdrawn from beneath the bar of butter 42 and the same is permitted to fall onto the wedge-shaped ledge 23 of the cutter tray. The bar of butter 42 in this position is ready for the cutting operation. The operator grasps the handle 43 which is attached to the cutter tray and pulls the same bodily outwardly. The ledge 23 is thus withdrawn from over the opening 9 and at the same time the cutter wire 25 which is located on a level with the ledge 23 passes beneath the bar of butter, and when the ledge 23 is completely removed, the ledge 24 which is located slightly below the ledge 23 receives one end of the butter bar. As the handle 43 is again moved to its former position, the cutter wire 25 passes through the lower portion of the bar of butter, thereby slicing a portion or square from the bar.

An ejector piece is shown at 44. This piece consists of a U-shaped spring band of thin material which is soldered or otherwise attached at one end to a flange 49 on the strap 22, as at 45. An L-shaped strap 49' overlies the free end of this band and limits the movement thereof. The free end 44' of the band 44, projects beyond the edge of the strap 49' and is adapted to abut against a cam member in the form of a wire 46, having a cam surface 50 thereon. The cam member 46 is fastened to a side wall of the ledge 24, as at 47 and 48. On the inward movement of the butter cutter the slice of butter rests on the ledge 24 and encounters the ejector 44. In order to assure that the slice of butter will not adhere to the ejector 44, the latter is given a vibratory movement by the cam member 46, just described. The cam face 50, of said cam member 46, in passing rearwardly in its movement will strike the free end 44' of the ejector 44. The first action is to move the free end of the ejector 44 rearwardly for a slight distance and as the point 44' passes the cam face 50 the resiliency of the ejector, which is made of spring metal, will cause it to rebound in the opposite direction, which movement however is limited by the stop or strap 49'. This vibratory movement dislodges the slice of butter if it should adhere to the ejector 44, causing the same to fall through the opening downwardly into the box 10. The piece of butter thus cut is engaged by the ejector 44 and as the same is released by the cam member 46, the piece of butter is forcibly ejected through the opening 9 into the dispensing box 10. The handle member 43 is thus operated until the entire bar of butter 42 in one of the compartments is sliced. When more butter is desired, the operator grasps the handle 38 and by means of the ratchet and pawl mechanism moves another of the compartments C over the opening 9 and the entire process of cutting is then repeated.

Throughout the drawings I have shown the surface with which butter is adapted to come in contact as having corrugations, projections or other means thereon whereby a minimum amount of plastic friction may be developed between the butter and the walls with which it comes in contact. For example, at 52 I have shown a depression, the purpose of which is to minimize the amount of plastic friction on a bar of butter. At 53 in Fig. 5 I have shown a series of corrugations on one of the inner faces of the dispensing and storing compartments C. The ledge 24 is also corrugated to minimize the plastic friction and the tendency to stick that butter possesses.

It is obvious then that I have provided a device which is adapted not only to store or house butter but to cut and dispense the same without necessity of removing the cover 4 to have access to the butter. I do not desire to limit myself to the exact arrangement of parts illustrated in the drawing and described in the specification. For example, while my device is designed primarily to accommodate the usual half pound package of butter, I contemplate constructing my device to accommodate quarter pound or pound packages, as the case may be.

It will be understood that various changes may be made in the details of construction without departing from the spirit or scope of the invention as defined by the appended claims.

I claim:

1. In a butter slicing machine, a container, a cover therefor, said container having an opening in the bottom thereof, a tray removably and rotatably mounted in said container, a pan adapted to contain ice in said tray, a ratchet and pawl mechanism adapted to rotate said tray, means comprising a handle adapted to operate said mechanism, a plurality of open ended, tubular, spaced storage compartments mounted in circumferential marginal relation on said tray, each of said compartments being adapted to house a bar of butter, a butter supporting member resiliently mounted on each of said compartments and having an inwardly extending ledge extending partially across the lower end of said compartments, a lug on said member, a cam member adjacent the opening in said container, said lug being adapted to engage said cam member whereby said ledge may be withdrawn from its position across the tubular compartment, said compartments being adapted to be brought into alignment with the opening of said container, a slidable tray disposed over said opening, means on said second mentioned tray for cutting a bar of butter stored within one of said tubular compartments, and means comprising a resilient clip and a cam member for ejecting a portion of the butter through said opening in the base.

2. In a butter slicing machine, a container, a cover therefor, said container having an opening in the bottom thereof, a tray removably and rotatably mounted in said container, a pan adapted to contain ice in said tray, a ratchet and pawl mechanism adapted to rotate said tray, means comprising a handle adapted to operate said mechanism, a plurality of open ended, tubular, spaced storage compartments mounted in circumferential marginal relation on said tray, each of said compartments being adapted to house a bar of butter, a butter supporting member resiliently mounted on each of said compartments and having an inwardly extending ledge extending partially across an open end of said compartments, a lug on said member, a cam member adjacent said opening in the container, said lug being adapted to engage said cam member whereby said ledge may be withdrawn from its position across the tubular compartment, said compartments being adapted to be brought into alignment with the opening of said container, a slidable tray disposed over said opening, said second mentioned tray comprising a wedge-shaped ledge and a rectangular ledge, said ledges being adapted to be disposed over said opening, a cutter comprising a thin wire disposed between said ledges, means for reciprocating said tray whereby when one of said ledges is withdrawn, said other ledge will be disposed over the opening, and when said other ledge is withdrawn, the cutter will slice the butter in one of said compartments and said first mentioned ledge will resume its position over said opening beneath the butter, means comprising a resilient member for removing a portion of the butter thus cut from said other ledge and allowing the same to pass through said opening, and a pocket beneath said opening adapted to receive a slice of butter thus cut.

3. A cutter for butter slicing machines comprising in combination a tray, means for reciprocating said tray, a butter cutter comprising a strand of wire for cutting a slice of butter, a support separate from said butter cutter for the bar of butter to be cut, said support and said cutter being secured to said tray and an ejector mounted independently of said tray for removing said slice of butter from said support.

4. A cutter for butter slicing machines comprising in combination a tray, means for reciprocating said tray, a butter cutter for cutting a slice of butter, a support separate from said butter cutter for the bar of butter to be cut, said support and said cutter being secured to said tray, an ejector mounted independently of said tray for removing said slice of butter from said support and means for vibrating said ejector.

5. A cutter for butter slicing machines comprising in combination a strap, a tray slidable therein, a pair of spaced butter supporting ledges on said tray, a cutter comprising a wire disposed between said ledges for cutting a slice of butter, and an ejector mounted independently of said tray for removing said slice of butter.

6. A cutter for butter slicing machines comprising in combination a strap, a tray slidable in said strap, a pair of butter supporting ledges on said tray, a cutter disposed between said ledges, an ejector supported by said strap, said ejector being made of a resilient strip of metal having a free end, and a cam adapted to engage said free end to vibrate said ejector.

7. A cutter for butter slicing machines comprising in combination a strap, a tray slidable in said strap, a pair of spaced corrugated butter supporting ledges, a cutter comprising a wire disposed between said ledges, an ejector on said strap, said ejector having a free end, and means on said tray for engaging said ejector to cause vibration thereof.

8. A cutter for butter slicing machines comprising in combination a slidable tray carrying a butter cutting element, a butter ejector mounted independently of said tray for removing a slice of butter from said tray, and means to vibrate said ejector.

9. A cutter for butter slicing machines comprising in combination a slidable tray carrying a butter cutting element, a butter ejector mounted independently of said tray for removing a slice of butter from said tray, means to vibrate said ejector, and means limiting the vibratory movement of said ejector.

10. A cutter for butter slicing machines comprising in combination a strap, a tray slidable in said strap, a pair of butter supporting ledges on said tray, a cutter comprising a piece of thin wire disposed between said ledges, a strip on said strap, and an ejector attached to said strip.

In testimony whereof I have signed my name to this specification.

JAMES S. DONNELLAN.